US011783397B2

(12) United States Patent
Gopalakrishnan et al.

(10) Patent No.: US 11,783,397 B2
(45) Date of Patent: Oct. 10, 2023

(54) OBTAINING INSIGHTS INTO DESIGN OF A PRODUCT BASED ON INTERACTION OF CONSUMERS WITH THE PRODUCT

(71) Applicant: International Business Machines Corporation, Armonk, NY (US)

(72) Inventors: Bharath Gopalakrishnan, Bengaluru (IN); Albee Jhoney, Bengaluru (IN); Lawrence Innasimuthu, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 17/445,007

(22) Filed: Aug. 13, 2021

(65) Prior Publication Data

US 2023/0051831 A1    Feb. 16, 2023

(51) Int. Cl.
*G06Q 30/00* (2023.01)
*G06Q 30/0601* (2023.01)

(52) U.S. Cl.
CPC ..... *G06Q 30/0621* (2013.01); *G06Q 30/0631* (2013.01); *G06Q 30/0641* (2013.01)

(58) Field of Classification Search
CPC .......... G06Q 30/0621; G06Q 30/0631; G06Q 30/0641
USPC ............................................... 705/26.1–27.2
See application file for complete search history.

(56) References Cited

U.S. PATENT DOCUMENTS

| 10,026,115 B2 | 7/2018 | Jin et al. |
| 2016/0260150 A1 | 9/2016 | Ackerman |
| 2018/0349795 A1* | 12/2018 | Boyle .................. G06Q 10/063 |
| 2020/0375293 A1 | 12/2020 | Koh |

FOREIGN PATENT DOCUMENTS

| KR | 101975750 B1 | 5/2019 |
| KR | 20200104941 A | 9/2020 |

OTHER PUBLICATIONS

Abate, "Stanford engineers create artificial skin that can send pressure sensation to brain cell," Standford News Service, Oct. 15, 2015, Accessed Aug. 12, 2021, 2 pages. https://news.stanford.edu/pr/2015/pr-artificial-skin-bao-101515.html.

"New 'e-dermis' brings sense of touch, pain to prosthetic hands," Science News, Johns Hopkins University, Jun. 20, 2018, Accessed Aug. 12, 2021, 3 pages. https://www.sciencedaily.com/releases/2018/06/180620171004.htm.

(Continued)

*Primary Examiner* — Anand Loharikar
(74) *Attorney, Agent, or Firm* — Yee & Associates, P.C.

(57) ABSTRACT

Generating a product design is provided. A plurality of product desirability models corresponding to a product is generated based on analysis of data corresponding to the product and features of the product that affect physical interactions between potential consumers of the product and the product. A set of insights into design of the product is generated based on the plurality of product desirability models corresponding to the product. A set of design element recommendations for the product is generated based on the set of insights into the design of the product generated from the plurality of product desirability models.

21 Claims, 8 Drawing Sheets

(56) References Cited

OTHER PUBLICATIONS

"Creating an artificial sense of touch by electrical stimulation of the brain," Kurzweil | Tracking the acceleration of intelligence, Oct. 26, 2015, Accessed Aug. 12, 2021, 3 pages. https://www.kurzweilai.net/creating-an-artificial-sense-of-touch-by-electrical-stimulation-of-the-brain.

Mraz, "Technology Adds the Sense of Touch to Prosthetic Hands," Machine Design, Jul. 25, 2014, Accessed Aug. 12, 2021, 14 pages. https://www.machinedesign.com/markets/medical/article/21832112/technology-adds-the-sense-of-touch-to-prosthetic-hands.

Lee et al., "The development of design ideas in the early apparel design process: a pilot study," International Journal of Fashion Design, Technology and Education, 8:2, 12 pages. https://www.tandfonline.com/doi/pdf/10.1080/17543266.2015.1026411.

Dillon et al., "Sensing the Fabric," Part of the Lecture Notes in Computer Science book series (LNCS, vol. 2058), pp. 63-68. http://www.dcs.gla.ac.uk/~stephen/workshops/haptic/papers/dillon.pdf.

"Apparel Recommendations usin Convolutional Neural Network," GitHub, Inc., Accessed Aug. 12, 2021, 5 pages. https://github.com/keshav1999/Amazon-Apparrel-Recomendation/blob/master/image_similarity_cnn.ipynb.

Ong, "Amazon's new algorithm designs clothing by analyzing a bunch of pictures," Aug. 24, 2017, Accessed Aug. 12, 2021, 2 pages. https://www.theverge.com/2017/8/24/16195858/amazon-ai-fashion-designer.

Au et al., Model of Design Process of Hong Kong Fashion Designers, Journal of Textile and Apparell, Technology and Management, vol. 4, Issue 2, Sep. 2004, 14 pages.

Rahman et al., "An exploratory study of fashion design: designer, product and consumer," Conference: European Academy of Design 2007 (EAD07), May 2007, Izmir, Turkey, 13 pages.

Simonite, "Haptic glove to touch on virtual fabrics," Technology, 13, Feb. 2007, Accessed Aug. 12, 2021, 2 pages. https://www.newscientist.com/article/dn11179-haptic-glove-to-touch-on-virtual-fabrics/.

Moreno, "How Retailers Can Make the Most of Their Data," Thought Leaders, Jun. 28, 2018, Accessed Aug. 12, 2021, 3 pages. https://www.forbes.com/sites/forbesinsights/2018/06/28/how-retailers-can-make-the-most-of-their-data/?sh=76ebb47e453c.

\* cited by examiner

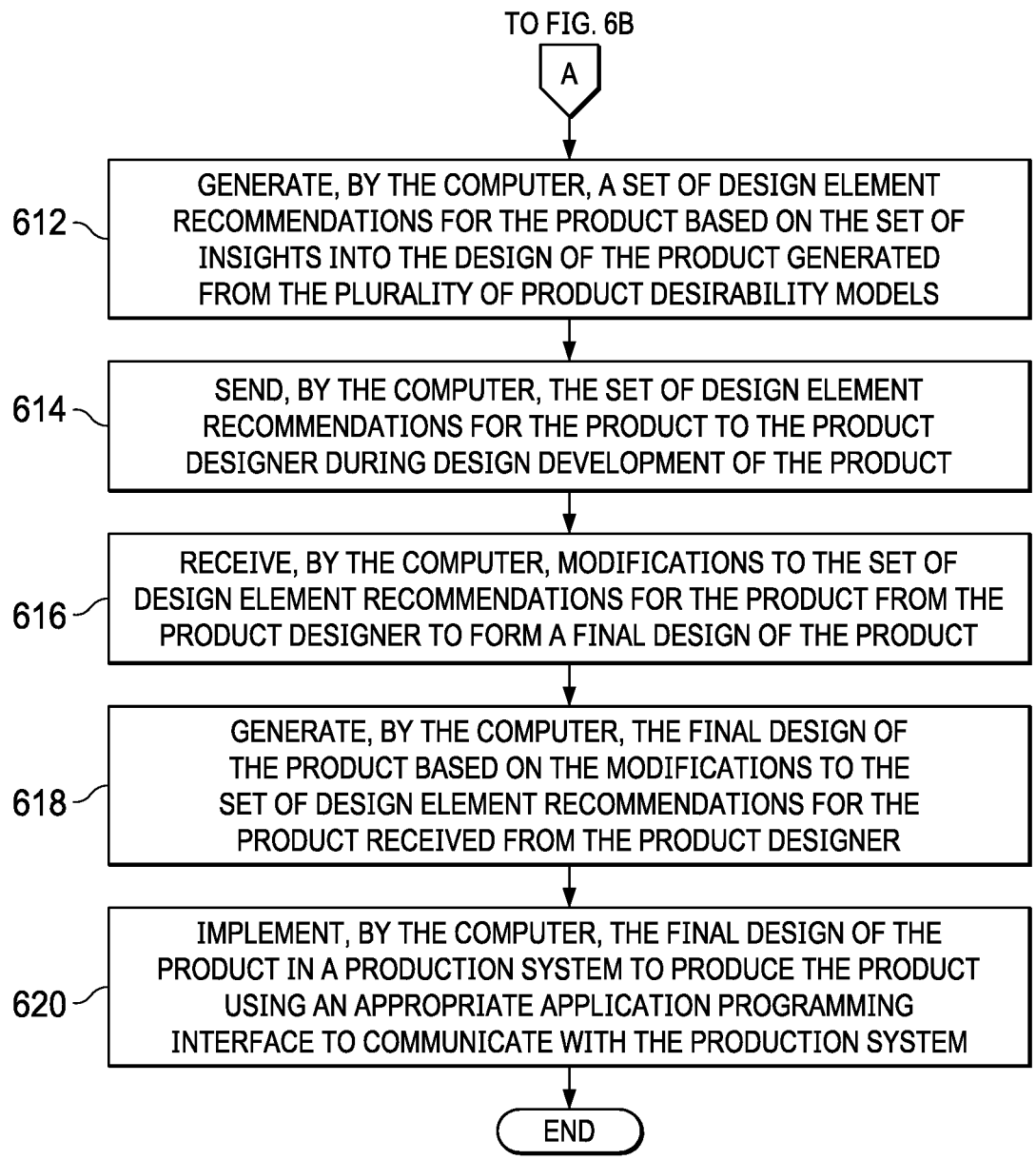

OBTAINING INSIGHTS INTO DESIGN OF A PRODUCT BASED ON INTERACTION OF CONSUMERS WITH THE PRODUCT

BACKGROUND

1. Field

The disclosure relates generally to product design and more specifically to generating insights into design of a product using product desirability models that were generated based on analysis of data corresponding to the product, which include product designer studio data, in-store data, and local business environment and weather data, and data describing interactions between potential consumers of the product and the product, itself, while in store prior to making a purchasing decision.

2. Description of the Related Art

Product design is the process designers use to blend user needs with business goals to help companies make successful products. Product design has recently become a broad term inclusive of service, software, and physical product design. Product designers work to optimize the user experience in the products the designers develop and help companies by making products sustainable for longer-term business needs. Product designers help make products which are not just easy to use, but also fine-tuned to do well in the marketplace. Product designers also help define product goals, create forecasts of product offerings and features, help companies release successful products, and the like.

SUMMARY

According to one illustrative embodiment, a computer-implemented method for generating a product design is provided. A computer generates a plurality of product desirability models corresponding to a product based on analysis of data corresponding to the product and features of the product that affect physical interactions between potential consumers of the product and the product. The computer generates a set of insights into design of the product based on the plurality of product desirability models corresponding to the product. The computer generates a set of design element recommendations for the product based on the set of insights into the design of the product generated from the plurality of product desirability models. According to other illustrative embodiments, a computer system and computer program product for generating a product design are provided.

BRIEF DESCRIPTION OF THE DRAWINGS

FIGS. 6A-6B are a flowchart illustrating a process for generating a product design in accordance with an illustrative embodiment.

DETAILED DESCRIPTION

Figure 1:
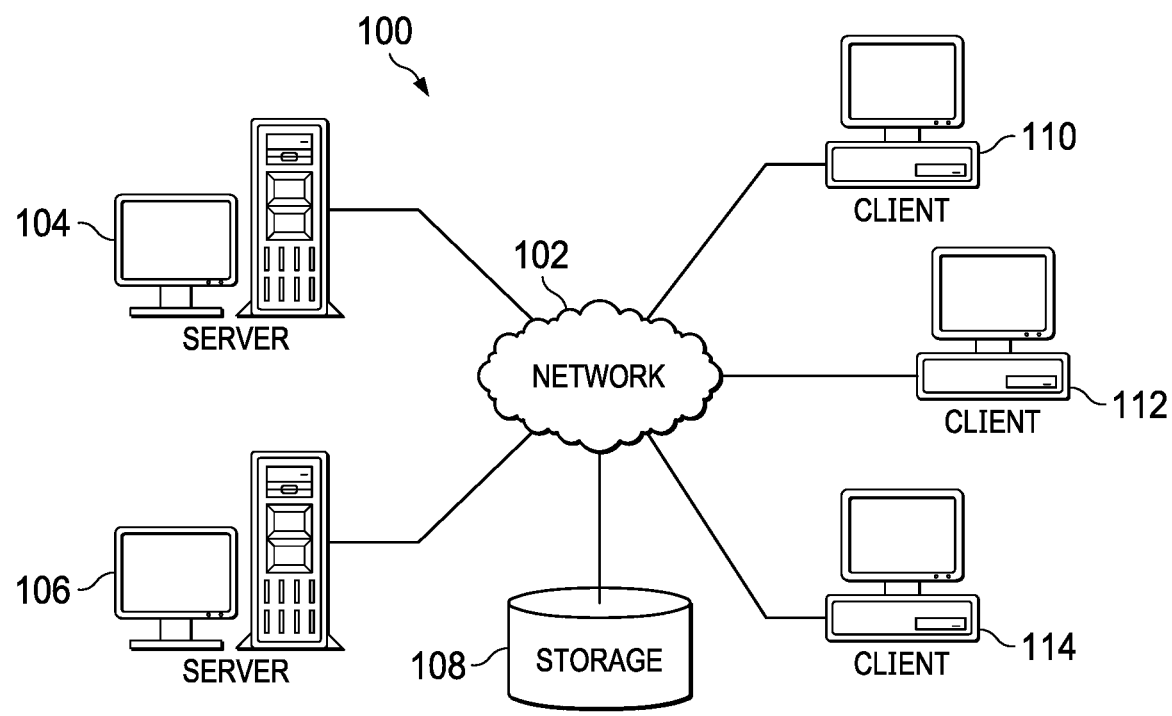
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
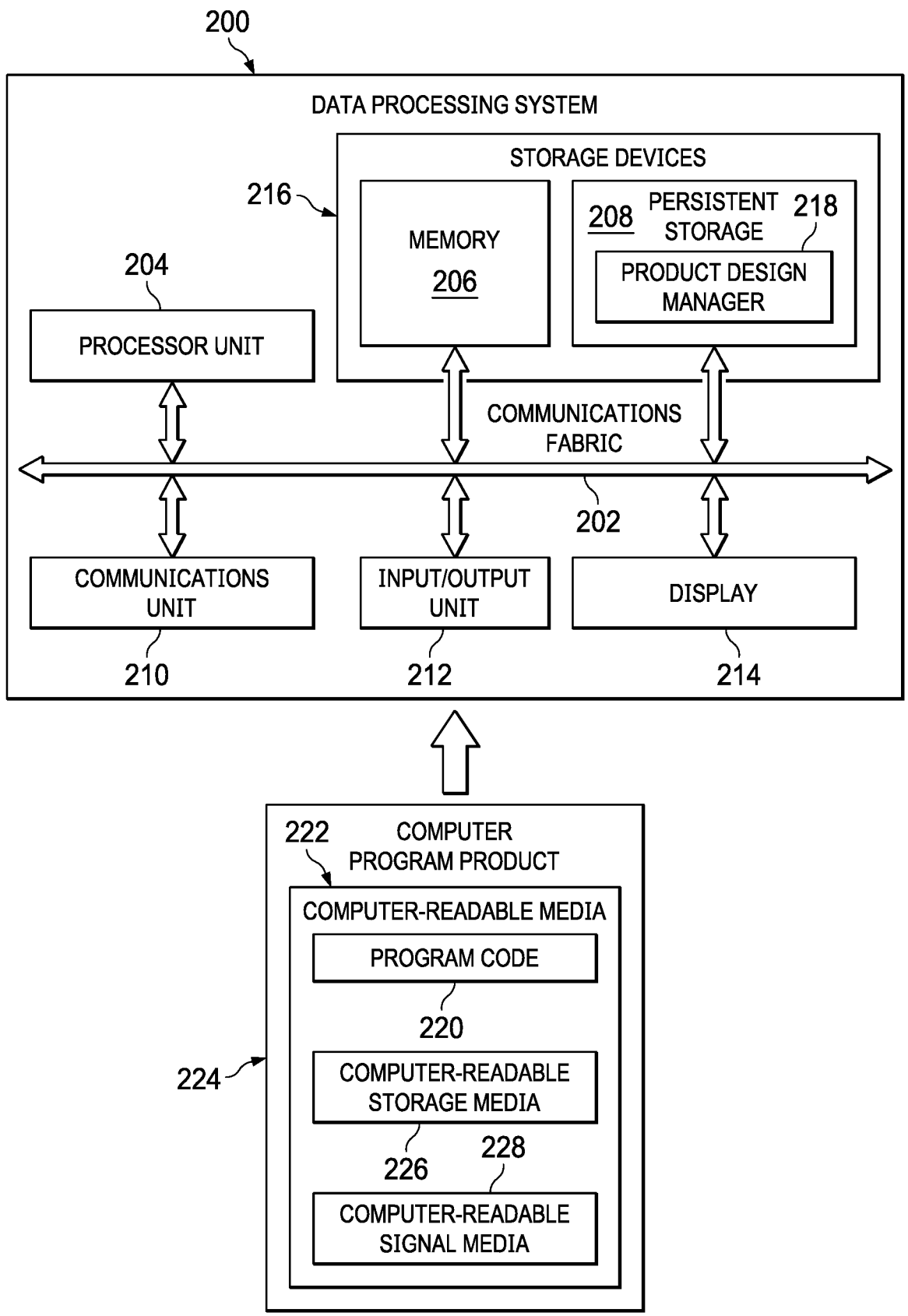
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, sensors, and other devices in which the illustrative embodiments may be implemented. Network data processing system 100 contains network 102, which is the medium used to provide communications links between the computers, data processing systems, sensors, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide product design services to client device users. The client device users may be, for example, product designers that are designing and development different products. The products may be any type of products requiring design by a product designer. For example, the products may be apparel (e.g., any type of clothing, accessories, footwear, or the like), electronic devices (e.g., any type of computer, phone, television, gaming system, and the like), appliances (e.g., any type of refrigerator, oven, dishwasher, stove, and the like), furniture (e.g., any type of chair, couch, table, desk, bed, dresser, lamp, and the like), sporting equipment (e.g., bat, glove, ball, helmet, racket, and the like), or any other type of product.

Server 104 and server 106 generate insights into a design of a particular product using product desirability models that were generated based on analysis of data corresponding to the product, which include product designer studio data, in-store or marketplace data where potential consumers physically interact with the product before making a purchasing decision, and local business environment and weather data, and data describing physical interactions between the potential consumers of the product and the product, itself, while the potential consumers are in store prior to making a purchasing decision. Further, server 104 and server 106 generate design element or feature recommendations for the products under design based on the generated insights. Design elements include, for example, visual features such as color, size, aspect ratio, and the like, touch features, functional features, and kinetic features of the product. Server 104 and server 106 send the design element recommendations for the products to the product designers designing the products for review and implementation.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart televisions, and the like, with wire or wireless communication links to network 102. Users of clients 110, 112, and 114 may utilize clients 110, 112, and 114 to access and utilize the product design services provided by server 104 and server 106.

In addition, clients 110, 112, and 114 represent network computers, data processing systems (e.g., point of sale devices), sensors (e.g., imaging devices such as still picture and video cameras), and the like. These client devices may be located in, for example, studios of the product designers who are designing and developing products, stores that sell the products, online business environment data services, online weather data services, and the like. It should be noted that server 104 and server 106 are capable of retrieving information from these client devices for analysis and generation of the product desirability models.

Storage 108 is a network storage device capable of storing any type of data in a structured format or an unstructured format. In addition, storage 108 may represent a plurality of network storage devices. Further, storage 108 may represent a central datastore that stores identifiers and network addresses for a plurality of computers, identifiers and network addresses for a plurality of point-of-sale devices, identifiers and network addresses for a plurality of sensors (e.g., cameras), identifiers and network addresses for a plurality of different data processing systems, identifiers for a plurality of different users, and the like. Storage 108 may also store product data, in-store data, business environment data, weather data, product desirability models, product design element recommendations, and the like. Furthermore, storage 108 may store other types of data, such as, for example, authentication or credential data that may include usernames, passwords, and the like associated with client device users (e.g., product designers).

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the product design processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores product design manager 218. However, it should be noted that even though product design manager 218 is illustrated as residing in persistent storage 208, in an alternative illustrative embodiment, product design manager 218 may be a separate component of data processing system 200. For example, product design manager 218 may be a hardware component coupled to communication fabric 202 or a combination of hardware and software components. In another alternative illustrative embodiment, a first set of components of product design manager 218 may be located in data processing system 200 and a second set of components of product design manager 218 may be located in a second data processing system, such as, for example, server 106 in FIG. 1. In yet another alternative illustrative embodiment, product design manager 218 may be located in a client device, such as, for example, client 110 in FIG. 1 in addition to, or instead of, data processing system 200.

Product design manager 218 controls the process of generating insights into the design of a product using a plurality of product desirability models that were generated based on an analysis of data corresponding to the product and data describing interactions between potential consumers of the product and the product, itself, while in-store prior to making a purchasing decision. The data corresponding to the product may include, for example, product designer studio data, store data, and local business environment and weather data. The product designer studio data may include, for example, technical specification data, image data, touch data, functional data, kinetic feature data, and the like, corresponding to the product under design. The in-store data may include, for example, consumer profile data, consumer/product interaction data, seller profile data, product inventory data, product commercial success data, and the like. The local business environment and weather data may include, for example, business and market trend data, seasonal weather pattern data, and the like, corresponding to a local area surrounding a store that sells the product. Furthermore, product design manager 218 generates design element recommendations for the product based on the obtained insights. Product design manager 218 sends the design element recommendations to the product designer for review and implementation.

As a result, data processing system 200 operates as a special purpose computer system in which product design manager 218 in data processing system 200 enables design of a product based on a plurality of product desirability models. In particular, product design manager 218 transforms data processing system 200 into a special purpose computer system as compared to currently available general computer systems that do not have product design manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Product design and development involves, for example, analyzing product designer and market requirements, researching personal inspirations and market trends, drawing a product design, selecting materials for the product considering design elements, such as, color, texture, print, shape, dimensions, weight, shape, line, form, and the like, prototyping, data collection, production, and the like.

The product is then placed "on sale" during the lifecycle of the product in the marketplace. A multitude of data is collected regarding sales of the product from, for example, distributors, retailers, and the like. In addition, product feedback is collected from product consumers and sellers. Also, product consumption patterns are collected from different geographic locations. All of this information is provided to the product designer as input for future product design and development.

Illustrative embodiments assist the product designer in market research, design development, product material selection, and the like. Currently, the product designer already has access to the following data regarding a product, such as, for example, product sales data segmented by markets, sellers, customers, and the like; market research data based on questionnaires; product feedback from consumers; online clicks in e-business web-portals by potential product consumers; in-store product photo and video data; and the like. However, the product designer may want to know which particular inspirations and design elements are most desired by people (i.e., potential product consumers) based on their in-store touch and feel experiences with the product irrespective of commercial success. In other words, the product designer would like to obtain insights into the desires of a person even if that person did not buy the product from the store. These insights will assist the product designer in making informed decision regarding the product.

Currently, a product seller is tasked with collecting data from consumers regarding their personal preferences (e.g., likes and dislikes). While a consumer is in-store and is trying out different products, the seller will ask a series of questions which is taken as feedback. The feedback data is aggregated from multiple consumers across multiple stores to a central datastore. The aggregated feedback data is analyzed to gain insights regarding the product design choices.

However, data collection using explicit questions and answers is error prone. For example, the consumer may not be interested in answering the questions. Also, the questioning and answering process may interfere with the actual sale of the product due to the distraction.

Illustrative embodiments profile all the products in a designer's studio before a product goes to market. This involves illustrative embodiments collecting the touch and feel data corresponding to a product. This may include illustrative embodiments obtaining technical specifications regarding the product (e.g., materials that comprise the product) from relevant documents. Illustrative embodiments may also utilize image processing techniques to collect product visual design elements, such as, for example, color, texture, print, pattern, shape, proportions, weight, shape, line, form, and the like, with varying environmental conditions, such as, for example, daytime, nighttime, sunny, rainy, and the like.

Illustrative embodiments may also utilize mannequins or robots equipped with an array of sensors to collect touch and feel data regarding the product in varying external environmental conditions and varying internal body conditions. For example, illustrative embodiments may utilize mannequins or robots integrated with, for example, artificial skin that can sense pressure, e-dermis that can provide a real sense of touch, smart fabric with dielectric or conductive threads that can measure movements and pressure. Thus, illustrative embodiments using mannequins or robots so equipped with such sensors can collect the touch and feel data regarding the product and kinetic product design elements. Further, illustrative embodiments can collect the kinetic product design elements, such as, for example, motion of the product relative to the body using video streams captured by a set of cameras.

Furthermore, while the product is in store, illustrative embodiments can collect data describing the interaction between a consumer and the product. For example, illustrative embodiments can track movement of the product from warehouse to display within the store (e.g., prime store location), track consumer historical buying patterns of the product, track whether the product was picked up by a consumer for a second look or for a trial, track movement of product from a display area to a trial area by a consumer, track movement of the product from display area to an in-store viewing area (e.g., mirrored area) by a consumer, track selections by the customer of other products that are related to the product, track an amount of time the product was with the consumer before placing the product back in the display area or purchasing the product. Moreover, illustrative embodiments can collect data from the seller, such as, for example, geographic location of the store, store inventory, product sales data, discounted product sales data, and the like.

Illustrative embodiments also collect environmental data, such as, for example, economic and market condition data corresponding to an area surrounding a particular store selling the product, weather data (e.g., current and future forecasts), local events occurring around that particular store, and the like. Illustrative embodiments aggregate and analyze the data collected from the store, along with the product design data, to gain insights regarding the desirability of the product by different types of consumers and sellers. Illustrative embodiments utilize these product desirability insights as input into a product design application, while making decisions related to design elements during the design and development of the product.

Products are designed and released from the product designer's studio. Illustrative embodiments collect different types of data regarding a particular product from the product designer's studio. For example, illustrative embodiments collect technical specification data of the product, such as, for example, product design shape and pattern, which can include form, line, balance, and the like, color or color combination, size, shape, line, weight, material, texture, and the like.

In addition, illustrative embodiments may also collect from the product designer's studio intended functional aspects of the product, such as, for example, whether the product is intended for protection from mechanical impact, physical injury, heat, cold, snow, rain, electric shock, and the like, whether the product is intended for sports depending upon the particular sport and its environment requirements, whether the product is intended for medical use, whether the product is intended to be environmentally friendly (e.g., organic or natural material that is biodegradable and non-polluting with low carbon footprint, whether the product is intended for business or personal use, and the like. Illustrative embodiments can collect this information from, for example, existing designer management systems, sketches and murals drawn from inspirations such as art, science, history, and the like, material manufacturing systems, product designing software, and the like.

Illustrative embodiments further collect visual specification data of the product. Illustrative embodiments collect the visual features of the product from the product designer's studio. Visual features of the product include, for example, color, texture, print, pattern, shape, proportions, weight, shape, line, form, and the like. Illustrative embodiments collect this visual feature data by, for example, recording static images (e.g., pictures) or moving images (e.g., video) of the product in relation to a consumer. Illustrative embodiments analyze the images to extract the visual features of the product relative to the consumer.

Illustrative embodiments further collect touch and feel specification data of the product. Illustrative embodiments collect the touch and feel features of the product, which may include, for example, physical, structural, and electromagnetic properties of the material comprising the product as felt by a consumer, from the product designer's studio. Illustrative embodiments collect this product touch and feel data from, for example, a mannequin or robot equipped with smart fabric with dielectric or conductive threads in parts where the product is expected to interact with different parts of the body of the consumer. Illustrative embodiments utilize the smart fabric to sense and record the electromagnetic properties of the product's material as the material interacts with the body. Illustrative embodiments may also utilize a mannequin or robot equipped with sensors, such as, for example, artificial skin, e-dermis, or the like, to collect the touch and feel data. Illustrative embodiments can further direct the mannequin or robot, which is equipped with sensors, to handle and use the product.

Illustrative embodiments collect the sensor data from the mannequin or robot while the mannequin or robot handles and utilizes the product under different conditions. The different conditions may include, for example, dynamically varying external environmental conditions, internal mannequin or robot body conditions, and the like. The product designer can manually provide physical properties of the product, such as, for example, materials comprising the product, dimensions, and the like, or illustrative embodiments can automatically obtain the physical properties from technical specification data.

Illustrative embodiments further collect kinetic specification data of the product. Illustrative embodiments collect the kinetic features of the product from a product designer's studio. The kinetic features are, for example, movements of the product with regard to the body of a consumer. Illustrative embodiments can collect the kinetic features of the product using, for example, fluorescent tags located on different parts of the product that are visually recognizable by a camera for following the product's movement. Also, a mannequin, robot, or live model can be tagged with wired or wireless sensors. Illustrative embodiments can track and record movements of the mannequin, robot, or live model while, for example, handling, utilizing, or wearing the product using received data from the sensors. The mannequin, robot, or live model handles, utilizes, or wears the visually tagged product and moves to mimic day-to-day usage of the product. Illustrative embodiments may also record the movement of the product using a video camera under different conditions. For example, illustrative embodiments may record the same movement repeatedly for a given usage pattern of the product under varying external environmental conditions. Illustrative embodiments analyze the video recording of the different movements by the mannequin, robot, or live model and the corresponding movement of the product.

Illustrative embodiments also collect data from stores that sell the product. The collected data from a particular store may include, for example, consumer profile data. Consumer profile data may include, for example, physical attributes of consumers of the product, such as height, weight, build, and the like, historical product purchasing patterns, historical consumer store visits, consumer preferences, and the like. Illustrative embodiments can collect this consumer profile data from, for example, the store's point-of-sale system, the store's camera system, social media websites, and the like.

Illustrative embodiments further collect consumer product trial data from the store. Illustrative embodiments collect data regarding a customer trying the product. For example, illustrative embodiments collect data such as the number of customers trying the product, the number of times a customer switches between different types or sizes of the product, the number of times customers rejected the product trial, store location where the trial occurred (e.g., trial area, mirrored area, or the like), customer's product preferences, and the like. Illustrative embodiments can collect this consumer product trial data using, for example, the store's camera system located at potential trial locations, radio frequency identification (RFID) tags located on the product and data received from RFID tag readers at the potential trial locations in the store, data received from RFID tag readers in product shelves or display locations in the store, data received from RFID tag readers in the shopping bags, shopping carts, and the like.

As the product moves from the store self to various trial locations, illustrative embodiments collect events of interest from the sensors (i.e., the RFID tag readers, camera system, and the like). As the product moves in and out of shopping bags and carts, illustrative embodiments identify consumer preferences (e.g., selections). As the product moves back to the store shelf, either by a consumer or by store personnel, illustrative embodiments collect rejection data corresponding to the product. Further, illustrative embodiments using the store's camera system may identify consumer preferences when consumers try the product based on analyzing facial expressions.

Illustrative embodiments further collect consumer affinity data for the product from the store. Illustrative embodiments collect the consumer affinity data for the product while in the store based on, for example, average duration the product is with a consumer, average duration the product is with a consumer before and after product trial, average duration the product is with a consumer during the trial, and the like. Illustrative embodiments may determine this consumer affinity data for the product based on correlating data received from RFID tag readers in store shelves, shopping bags and carts, product trial areas, and the like, to measure the duration of the product with consumers.

Illustrative embodiments further collect consumer product pairing data from the store. Illustrative embodiments collect the interest of consumers in pairing products with the product while in the store by identifying a number of other products paired with the product, duration of product pairing such as before, during, and after product trial, type of consumers pairing the product, and the like. Illustrative embodiments collect the consumer product pairing data using data received from RFID tag readers in shopping bags and carts to identify product pairings, data received from RFID tag readers in product trial areas to measure duration of product pairings during trials of the product, data received from point-of-sale terminals at the store to identify product pairings purchased by consumers, information retrieved from consumer profile data, which was collected from the store, to determine the nature of product pairings by different consumers and consumer groups.

Illustrative embodiments further collect seller profile data from the store. Illustrative embodiments collect the seller profile data that include, for example, product brands and designers associated with the store type (e.g., single brand, multiple brands, super store, or the like), geographic location of the store (e.g., country, region, state, city, neighborhood, street, and the like), type of product consumers visiting the store, product turnover in the store, and the like. Illustrative embodiments collect the seller profile data using, for example, public data sources such as store website, social media websites, store advertisements, and the like. Illustrative embodiments can also collect the seller profile data from the store's management systems that integrate with product suppliers, market data sources, and the like.

Illustrative embodiments further collect seller product inventory data. Illustrative embodiments collect the seller product inventory data that include, for example, number of in-stock products from a particular product designer, number of product sales per unit time (e.g., daily, weekly, monthly, quarterly, semi-annually, annually, and the like), number of related products with the same design but with different physical characteristics such as size, material, color, pattern, and the like, duration of the product in the seller's inventory, changes in the price (e.g., discounts) of the product while in inventory, number of times the product went out-of-stock or below a minimum threshold level of the product, number of products sold at a substantial discount, number of products returned by consumers, and the like. Illustrative embodiments collect the seller product inventory data using, for example, RFID tag readers in the seller's warehouse and store shelves reading RFID tags affixed to the product. The RFID tag can include, for example, the product's serial number, size, dimensions, material, color, weight, components, and the like. Illustrative embodiments may also collect the seller product inventory data from the inventory management system of the seller that maintains most of the data mentioned above. In addition, illustrative embodiments may collate the data from the RFID tag readers in the warehouse and store shelves with the data from the inventory management system to measure the product inventory data.

Illustrative embodiments further collect seller product highlight data. Seller product highlight data may include, for example, whether the product is highlighted in store hotspots (e.g., display windows, on or with mannequins, shown in visual media, placed in high foot traffic areas, and the like) of the store. Illustrative embodiments collect the seller product inventory data based on, for example, average duration of product in display areas, information regarding seasons and events as a background in the product's display areas, and the like. Illustrative embodiments can collect the average duration of the product in the display areas using, for example, information retrieved from the store's management systems. Illustrative embodiments can collect the seasonal data using, for example, information retrieved from online weather services. Illustrative embodiments can collect the events data using, for example, information retrieved from a combination of social media websites, seller advertisements, and the like.

Illustrative embodiments further collect seller commercial data for the product. The commercial data regarding the product may include, for example, volume of product sales, retail price of the product, selling price of product with discount, number of product returns, reasons for the returns, and the like. Illustrative embodiments can collect the seller commercial data for the product from, for example, the store's sales management system.

Illustrative embodiments further collect seller product relevance data from the store. For example, the store can have multiple sections dedicated to different client product producers and brands (e.g., clothing section, hardware section, appliance section, electronics section, and the like). Similarly, the store can organize products within a particular section by categories (e.g., clothing section can be organized by formal wear, casual wear, party wear, wedding wear, sporting wear, and the like). The product location and relevance data may include, for example, percent distribution of space by client product producer and brand, percent distribution of space by category (e.g., 50% for adult wear, 20% for child wear, and the like), relative position (e.g., distance) of the product from display hotspots within the store, percent of consumer foot traffic within the product section, and the like. Illustrative embodiments can determine the seller product relevance data using spatial distribution data that illustrative embodiments collect from the store's interior design and layout systems. Illustrative embodiments can collect the consumer foot traffic information from the store's camera system keeping track of the number of people walking into the store and through the different sections of the store.

Furthermore, illustrative embodiments collect retail business environment data. Overall retail business trends affect choices and sales of products. The retail business environment data can include, for example, overall product industry market trend, trends in different sales channels (e.g., online retail sales, single brand retail sales, multi-brand retail sales, and the like), seasonal business trends (summer season, winter season, holiday season, and the like), trends in consumer spending or purchasing power of the target market segment, and the like. Illustrative embodiments can collect the retail business environment data using, for example, market research data published online by trustworthy organizations.

Illustrative embodiments also collect locally relevant event data corresponding to the retail business environment. Choices of products by consumers are influenced by relevant events, such as, for example, festival events, sporting events, entertainment events, celebration events, and the like. Illustrative embodiments can determine the locally relevant event data by, for example, correlating a particular event with a particular product category, seasonal influence of that particular event, duration of event influence, and the like. Illustrative embodiments can collect the locally relevant event data from, for example, event calendars published online by local organizations and businesses, market research data published online by retail industry watchers regarding correlation between events and consumer product preferences, and the like.

Illustrative embodiments further collect local weather data corresponding to the retail business environment. Again, choices of products by consumers are influenced by the local weather both current and future. The local weather data may include, for example, baseline weather data (e.g., average weather pattern in a particular geographic location over a year), seasonal weather pattern changes, correlation between weather and products purchased, and the like. Illustrative embodiments can collect the local weather data from, for example, online weather monitoring and forecasting systems, market research data published online by retail industry watchers regarding correlation between weather and consumer product preferences, and the like.

Illustrative embodiments analyze the data collected above (i.e., product designer's studio data, store/seller data, and business environment/weather data) to obtain insights into the desirability of the product by different consumer types. Illustrative embodiments may utilize, for example, a clustering algorithm, such as partitional clustering, k-means clustering, distribution-based clustering, or the like, to perform the data analysis. Illustrative embodiments obtain the insights into the desirability of the product by different consumer types by generating a plurality of product desirability models based on the data analysis using the clustering algorithm. The plurality of product desirability models includes, for example, a product technical desirability model, a product design desirability model, a product functionality desirability model, a product seasonal desirability model, a product fashion desirability model, and a product commercial success model.

Illustrative embodiments utilize the product technical desirability model to learn consumer desirability for the technical specifications of the material (e.g., type, color, pattern, and the like) used in the product and the technical specifications (e.g., shape, size, fit, and the like), themselves, of the product. Illustrative embodiments generate the product technical desirability model using input data, such as, for example, product technical specification data, consumer profile data, consumer product trial data, consumer product affinity data, retail business environment relevant event data, retail business environment weather data, and the like. The insights that illustrative embodiments gain from the product technical desirability model can include, for example, which type of consumer prefers which type of product based on the number of consumer product trials, duration of the product trials, under what weather conditions, in a context of a local event.

Illustrative embodiments utilize the product design desirability model to learn consumer desirability for design elements of the product governed by the senses (e.g., sight, touch, and the like) of the consumers. Illustrative embodiments generate the product design desirability model using input data, such as, for example, product visual specification data, product touch specification data, product technical specification data, consumer profile data, consumer product trial data, consumer product affinity data, consumer product pairing data, retail business environment data, retail business environment relevant event data, retail business environment local weather data, and the like. The insights that illustrative embodiments gain from the product design desirability model can include, for example, which type of consumer prefers which type of visual attributes of the product and which type of touch and feel attributes of the product based on the number and duration of the product trials and pairing of products during the product trials, under what weather conditions, in a context of a local event and market trend.

Illustrative embodiments utilize the product functionality desirability model to learn consumer desirability for functional aspects of the product (e.g., how or where a consumer intends to use the product). Specifically, illustrative embodiments utilize the product functionality desirability model to learn the product's kinetic appeal to consumers, along with the touch and feel aspects of the product. For example, a consumer may intend to use the product in a formal event, sporting event, business event, or the like. Illustrative embodiments generate the product functionality desirability model using input data, such as, for example, product technical specification data (i.e., functional aspects), product kinetic specification data, product touch specification data, consumer profile data, consumer product trial data, consumer product affinity data, consumer product pairing data, retail business environment relevant event data, retail business environment local weather data, and the like. The insights that illustrative embodiments gain from the product functionality desirability model can include, for example, which type of consumer prefers which type of kinetic attributes of the product and which type of touch and feel attributes of the product under different external environmental and internal body conditions based on the number and duration of the product trials and pairing of products during the product trials, under what weather conditions, in a context of a local event and market trend.

Illustrative embodiments utilize the product seasonal desirability model to learn consumer desirability for the product based on the seasonal events, business events, market trends, and the like, which affect the commercial success of the product. Illustrative embodiments generate the product seasonal desirability model using input data, such as, for example, product technical specification data, seller profile data, seller product inventory data, seller product commercial success data, seller product relevance data, retail business environment data, retail business environment relevant event data, retail business environment local weather data, and the like. The insights that illustrative embodiments gain from the product seasonal desirability model can include, for example, which type of seller prefers which type of product to sell and seasonal relevance of the product based on commercial success and market value of the product, in a context of seasonal and local events and market trends.

Illustrative embodiments utilize the product fashion desirability model to learn about the fashion value of the product from the perspective of both the seller and the consumer based on the display of the product in the store. Illustrative embodiments generate the product fashion desirability model using input data, such as, for example, product technical specification data, seller profile data, seller product highlight data, seller product relevance data, retail business environment data, retail business environment relevant event data, and the like. The insights that illustrative embodiments gain from the product fashion desirability model can include, for example, which type of seller prefers which type of product to display (e.g., on mannequin, in multimedia display, and the like) and number of consumers viewing the product on display based on duration of the product on display and number of times consumers selected the product for trial, in a context of local events and market trends.

Illustrative embodiments utilize the product commercial success model to learn the desirability of the product by the seller and the consumer based on the commercial success of the product in the store. Illustrative embodiments generate the product commercial success model using input data, such as, for example, product technical specification data, seller profile data, seller product commercial success data, seller product relevance data, retail business environment data, and the like. The insights that illustrative embodiments gain from the product commercial success model can include, for example, which type of seller prefers which type of product to sell based on the commercial success and market value of the product, in a context of current business environment and market trend.

Moreover, illustrative embodiments utilize a product design recommender component. Currently, several product design software products exist. These existing product design software products include a library of design elements that enables the product designer to mix and match the design elements to create and visualize product design ideas. In the product designing process, the product designer makes a lot of decisions that can affect production and commercial viability of the product in the marketplace while staying in touch with the current product design trends.

The product desirability models generated by illustrative embodiments provide the product designer with insights into the preferences of real-life product consumers and sellers based on the choices made by the consumers and sellers in recent past across a wide range of market segments. The product designer can utilize the product desirability models to make decisions regarding material, color, pattern, fit, touch/feel, and the like of the product by assigning different weights to each of the product desirability models. For example, the product designer can assign weights to the different product desirability models on a scale of 1-10, where 1 is the lowest weight and 10 is the highest weight.

Illustrative embodiments can augment existing product design software products with the product design recommender component of illustrative embodiments. The product design recommender component receives, for example, selections of control parameters, target market segment (e.g., adults living is a metropolitan area with good buying potential), expected season (e.g., vacation, holiday, or the like), expected weather (e.g., hot and humid), expected retail business environment, and the like from the product designer. In addition, the product designer can upload features of the product under design, such as, for example, technical specifications of the product, images (e.g., still pictures or video) of the product, and the like, into the product design recommender component.

The product design recommender component recommends, for example: visual design elements (e.g., material, color, patterns, texture, line, shape, form, and the like) for the product based on insights obtained from the product technical desirability model and the product design desirability model; functional design elements (e.g., protective, sport, medical, environmental, business, or the like) based on insights obtained from the product functionality desirability model and the product seasonal desirability model; fashion design elements (e.g., symmetry, balance, asymmetry, proportion, harmony, contrast, and the like) based on insights obtained from the product fashion desirability model and the product commercial success model. The product designer can dynamically vary the weights of the different product desirability models to view different variations in the recommended design elements for the product.

Furthermore, the product design recommender component can utilize a multilevel product desirability analysis to generate design element recommendations for the product. For example, in order to recommend a particular color or any other visual design element for the product, the product design recommender component can perform a level-1 product desirability analysis. In the level-1 product desirability analysis for this particular example, the product design recommender component utilizes the product technical desirability model, where the control parameters include consumer profile data, retail business environment relevant event data, and retail business environment local weather data, to obtain insights into a cluster of colors preferred by consumers. In addition, the product design recommender component utilizes the product design desirability model, where the control parameters include consumer profile data, product technical specification data, retail business environment data, retail business environment relevant event data, and retail business environment local weather data, to obtain insights into the cluster of colors preferred by consumers for a given product design.

The product design recommender component then performs the level-2 product desirability analysis. In the level-2 product desirability analysis for the particular example above, the product design recommender component combines the cluster of colors identified in the level-1 analysis using the weights assigned by the product designer to the product technical desirability model and the product design desirability model. The product design recommender component may utilize this two-level analysis process for each respective design element of the product.

It should be noted that entities, such as, for example, companies, enterprises, organizations, institutions, agencies, and the like, can purchase one or more of the product desirability models to design customized products to meet their own business needs. Further, the product desirability models can be extended to be used in association with accessories for a particular product.

Thus, illustrative embodiments provide one or more technical solutions that overcome a technical problem with designing a product based on obtained insights from consumer experience while trying the product in store. As a result, these one or more technical solutions provide a technical effect and practical application in the field of product design.

Figure 3:
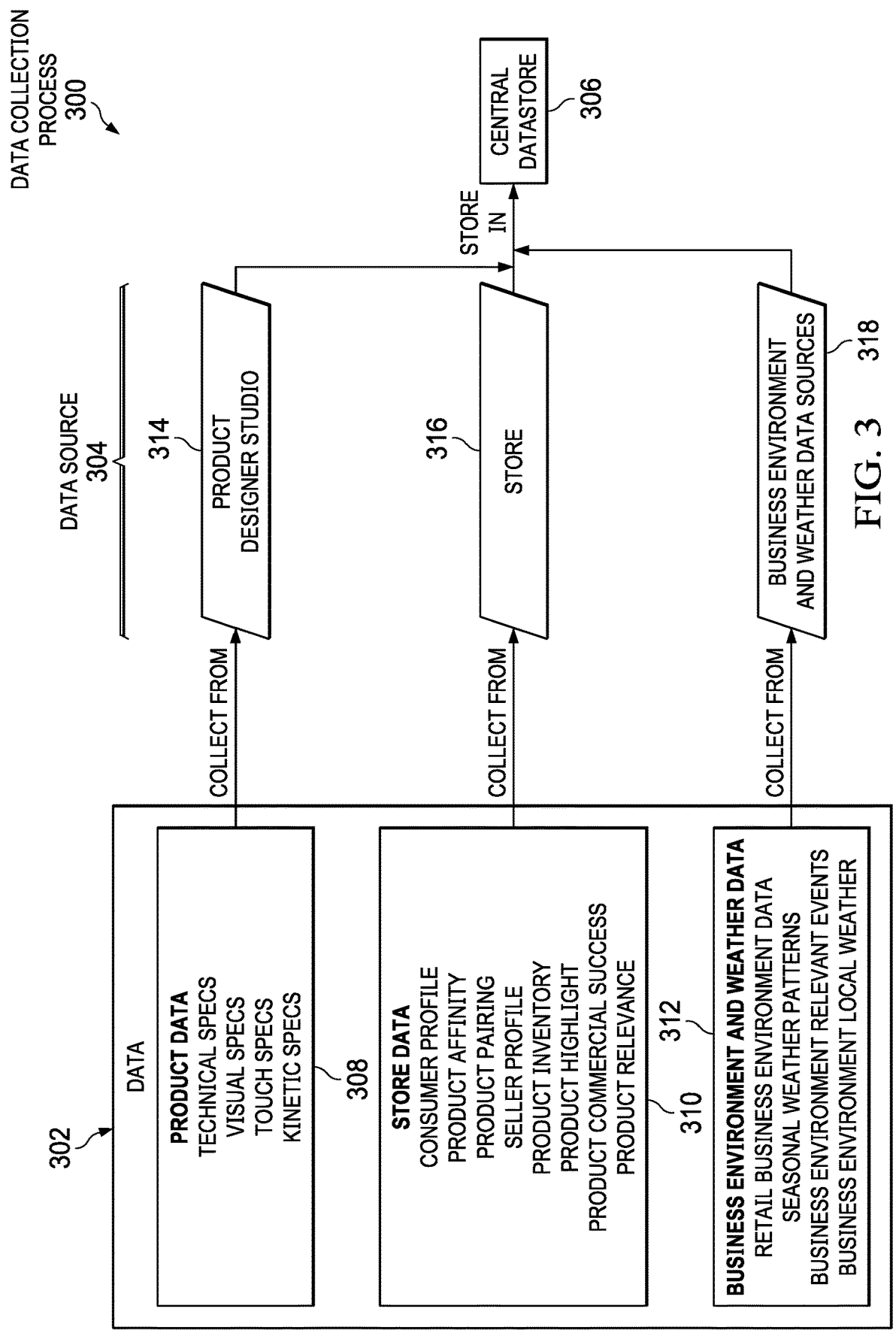
FIG. 3 is a diagram illustrating an example of a data collection process in accordance with an illustrative embodiment.

With reference now to FIG. 3, a diagram illustrating an example of a data collection process is depicted in accordance with an illustrative embodiment. Data collection process 300 may be implemented in a computer, such as, for example, server 104 in FIG. 1 or data processing system 200 in FIG. 2. For example, data collection process 300 may be implemented in product design manager 218 in FIG. 2.

In this example, data collection process 300 includes data 302, data sources 304, and central datastore 306. However, it should be noted that data collection process 300 is intended as an example only and not as a limitation on illustrative embodiments. In other words, data collection process 300 may include any type and number of data, data sources, and datastores.

Data 302 includes product data 308, store data 310, and business environment and weather data 312. Product data 308 may include, for example, technical specifications, visual specifications, touch specifications, kinetics specifications, and the like, which correspond to a particular product. The product may be any type of product, such as, for example, a garment, footwear, electronic device, appliance, furniture, jewelry, vehicle, or the like. The product design manager collects product data 308 from a set of computers, data processing systems, and sensors in product designer studio 314. Product designer studio 314 is a work area where a product designer develops and designs the product.

Store data 310 may include, for example, consumer profile data, consumer product affinity data, consumer product pairing data, seller profile data, product inventory data, product highlight data, product commercial success data, product relevance data, and the like, which correspond to that particular product. The product design manager collects store data 310 from a set of computers, data processing systems, and sensors in store 316. Store 316 represents a set of stores that sells the product.

Business environment and weather data 312 may include, for example, retail business environment data, seasonal weather pattern data, retail business environment local relevant events data, retail business environment local weather data, and the like. The product design manager collects store business environment and weather data 312 from business environment and weather data sources 318. Business environment and weather data sources 318 represent a plurality of online services that provide current and forecasted local business and weather information. The product design manager stores product data 308, store data 310, and business environment and weather data 312 in central datastore 306 for processing and analysis.

Figure 4A:
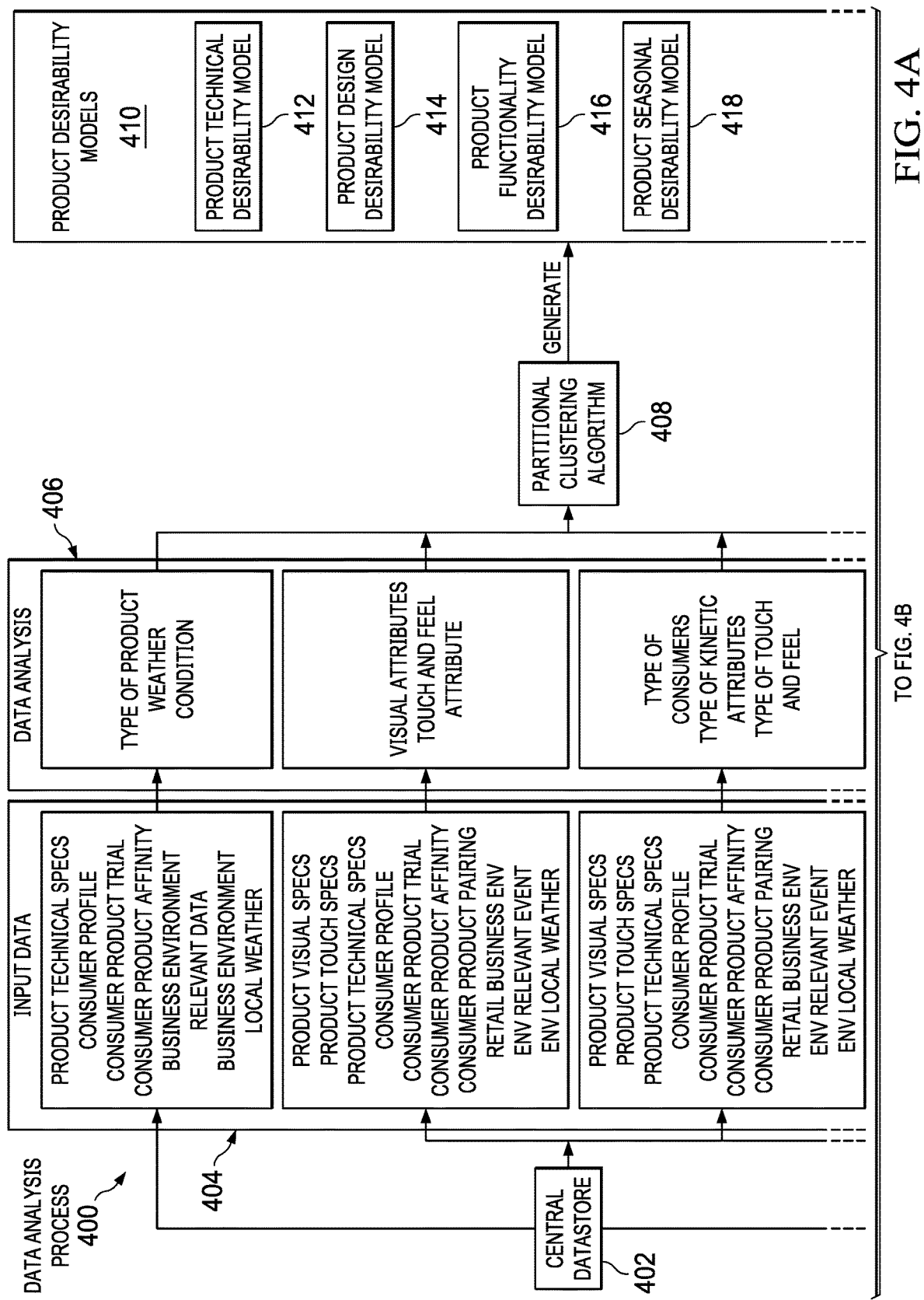
FIGS. 4A-4B are a diagram illustrating an example of a data analysis process in accordance with an illustrative embodiment.
Figure 4B:
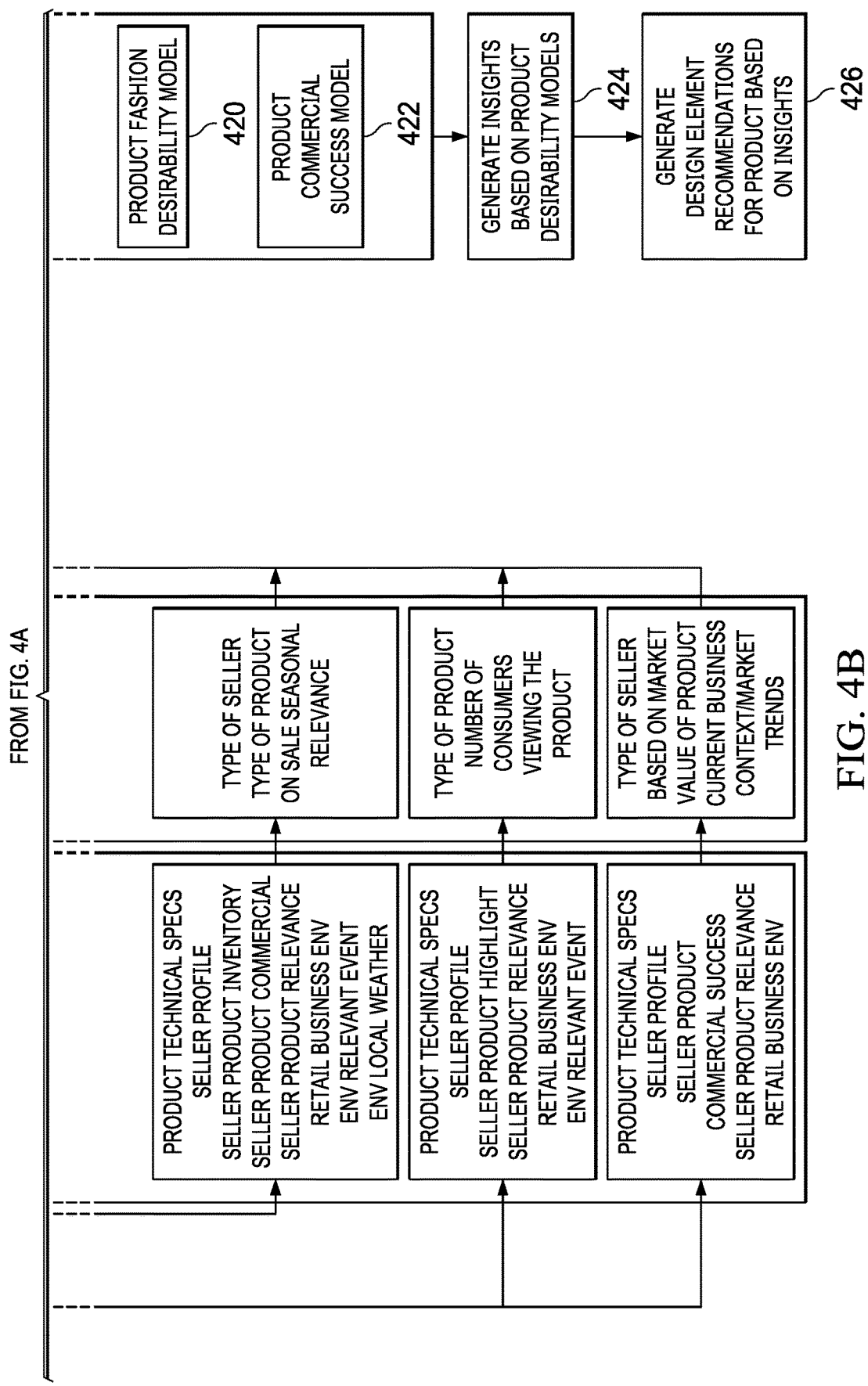

With reference now to FIGS. 4A-4B, a diagram illustrating an example of a data analysis process is depicted in accordance with an illustrative embodiment. Data analysis process 400 may be implemented in a computer, such as, for example, server 104 in FIG. 1 or data processing system 200 in FIG. 2. For example, data analysis process 400 may be implemented in product design manager 218 in FIG. 2.

In this example, data analysis process 400 includes central data store 402, input data 404, data analysis 406, partitional clustering algorithm 408, and product desirability models 410. The product design manager accesses central datastore 402 and retrieves input data 404. Input data 404 represent a plurality of different types of information corresponding to the product, consumer, seller, store, business environment, weather, and the like and may be, for example, product data 308, store data 310, and business environment and weather data 312 stored in central datastore 306 in FIG. 3.

The product design manager performs data analysis 406 on input data 404 using partitional clustering algorithm 408 to generate product desirability models 410. It should be noted that partitional clustering algorithm 408 is intended as an example only and not as a limitation on illustrative embodiments. In other words, illustrative embodiments may utilize other types of clustering algorithms to perform the data analysis. Alternatively, illustrative embodiments may utilize machine learning, such as, for example, supervised learning, semi-supervised learning, unsupervised learning, or the like, to perform the data analysis.

Product desirability models 410 represent a plurality of different desirability models corresponding to the product. A desirability model indicates a level, degree, or amount of appeal, attraction, or interest in the product with regard to different product characteristics or attributes. For example, product desirability models 410 include product technical desirability model 412, product design desirability model 414, product functionality desirability model 416, product seasonal desirability model 418, product fashion desirability model 420, and product commercial success model 422. However, it should be noted that product desirability models 410 are meant as examples only and not as limitations on illustrative embodiments. In other words, product desirability models 410 may include any number and type of product desirability models.

At 424, the product design manager generates insights into design of the product based on at least one of product desirability models 410. Then, at 426, the product design manager generates design element recommendations for the product based on the generated insights. The product design manager sends the generated design element recommendations to the product designer for review and possible modification. Upon receiving design element modifications for the product, the product design manager generates a final design for the product. The product design manager submits the final design for the product to the product designer. Upon receiving approval of the final design of the product, the product design manager implements the final design in a production system to produce the product.

Figure 5:
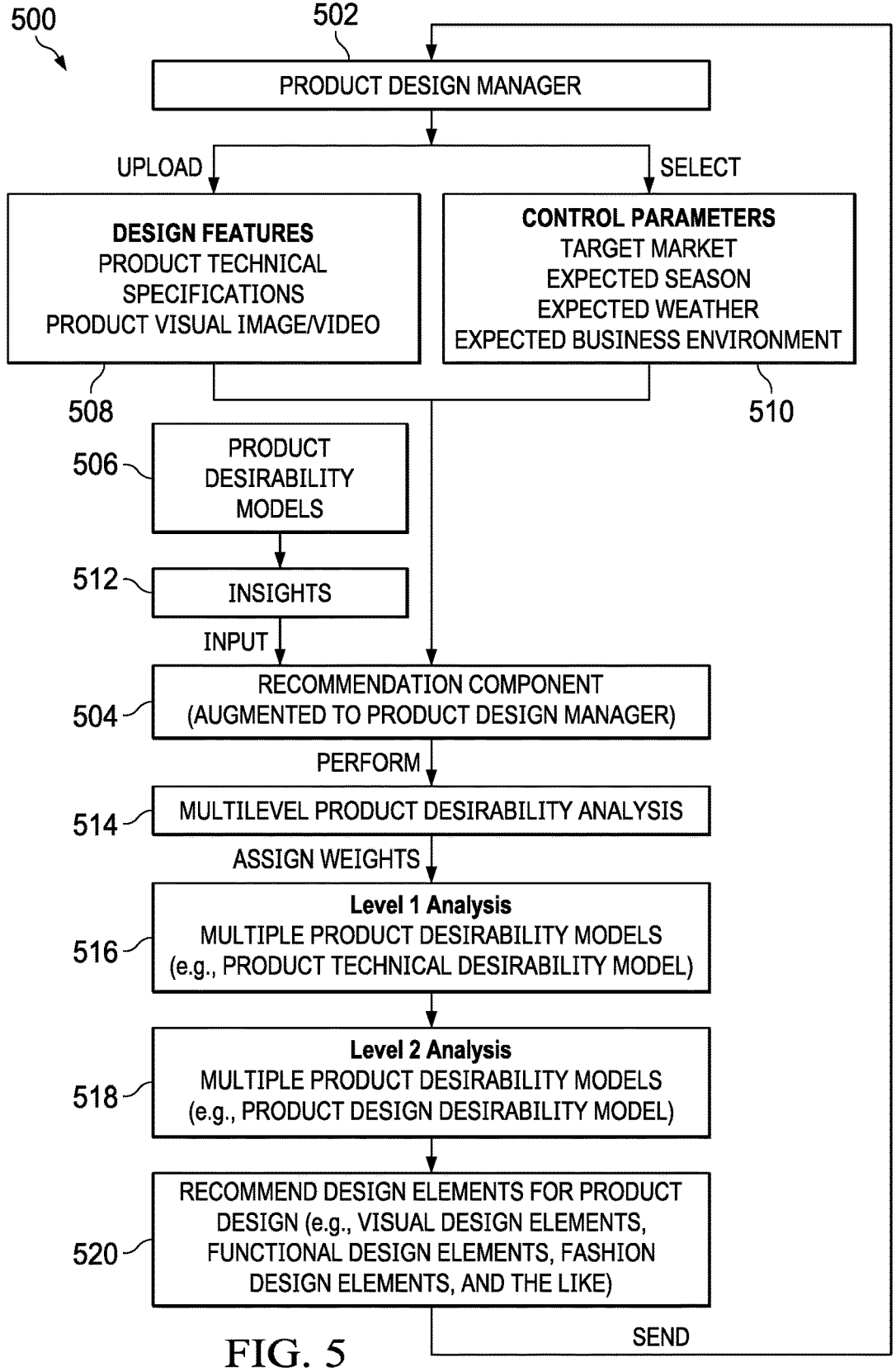
FIG. 5 is a diagram illustrating an example of a product design recommendation process in accordance with an illustrative embodiment.

With reference now to FIG. 5, a diagram illustrating an example of a product design recommendation process is depicted in accordance with an illustrative embodiment. Product design recommendation process 500 may be implemented in a computer, such as, for example, server 104 in FIG. 1 or data processing system 200 in FIG. 2. For example, product design recommendation process 500 is implemented in production design manager 502, such as, for example, product design manager 218 in FIG. 2. Production design manager 502 includes recommendation component 504.

Production design manager 502 utilizes product desirability models 506, such as, for example, product desirability models 410 in FIGS. 4A-4B, to generate insights 512. Production design manager 502 inputs insights 512 to recommendation component 504 for analysis. Further, product design manager 502 uploads design features 508 and selects control parameters 510. Design features 508 may include, for example, product technical specifications, product visual images or video, and the like. Control parameters 510 may include, for example, target market, expected season, expected weather, expected business environment, and the like.

Production design manager 502 also inputs design features 508 and control parameters 510 into recommendation component 504 for analysis. At 514, recommendation component 504 performs multilevel product desirability analysis using design features 508, control parameters 510, and insights 512. In addition, recommendation component 504 assigns weights to product desirability models 506 based on input from the product designer.

At 516, recommendation component 504 performs level-1 analysis using multiple product desirability models. At 518, recommendation component 504 performs level-2 analysis using multiple product desirability models. At 520, recommendation component 504 recommends design elements for the product design based on the level-1 and level-2 analyses. The design elements may include, for example, visual design elements, functional design elements, fashion design elements, and the like. The recommendation component 504 sends the recommended design elements for the product design to product design manager 502.

Figure 6A:
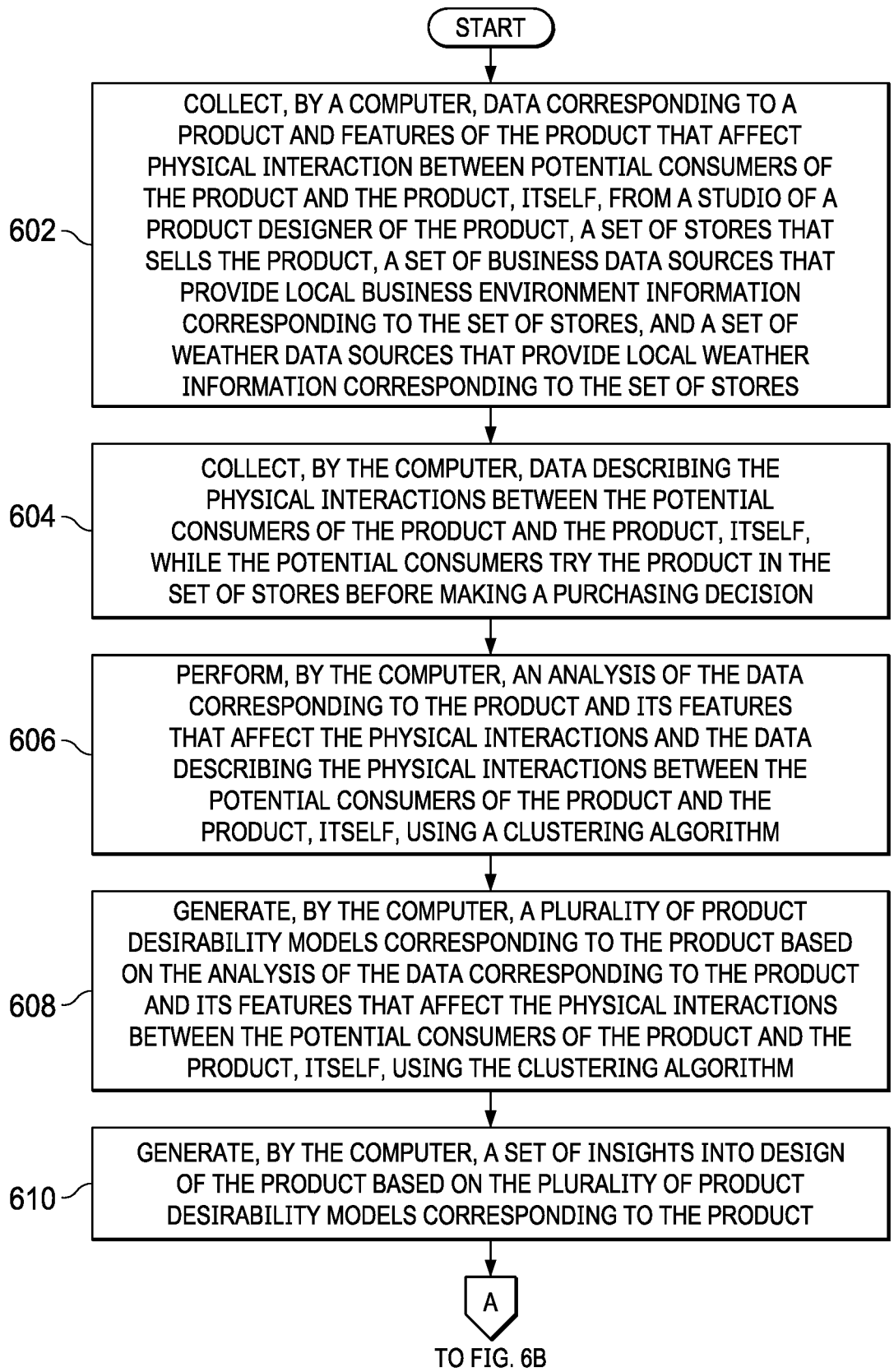

With reference now to FIGS. 6A-6B, a flowchart illustrating a process for generating a product design is shown in accordance with an illustrative embodiment. The process shown in FIGS. 6A-6B may be implemented in a computer, such as, for example, server 104 in FIG. 1 or data processing system 200 in FIG. 2. For example, the process shown in FIGS. 6A-6B may be implemented in product design manager 218 in FIG. 2.

The process begins when the computer collects data corresponding to a product and features of the product that affect physical interactions between potential consumers of the product and the product, itself, from a studio of a product designer of the product, a set of stores that sells the product, a set of business data sources that provide local business environment information corresponding to the set of stores, and a set of weather data sources that provide local weather information corresponding to the set of stores (step 602). In addition, the computer collects data describing the physical interactions between the potential consumers of the product and the product, itself, while the potential consumers try the product in the set of stores before making a purchasing decision (step 604).

The computer performs an analysis of the data corresponding to the product and its features that affect the physical interactions and the data describing the physical interactions between the potential consumers of the product and the product, itself, using a clustering algorithm (step 606). The computer generates a plurality of product desirability models corresponding to the product based on the analysis of the data corresponding to the product and its features that affect the physical interactions between the potential consumers of the product and the product, itself, using the clustering algorithm (step 608).

Further, the computer generates a set of insights into design of the product based on the plurality of product desirability models corresponding to the product (step 610). Furthermore, the computer generates a set of design element recommendations for the product based on the set of insights into the design of the product generated from the plurality of product desirability models (step 612).

The computer sends the set of design element recommendations for the product to the product designer during design development of the product (step 614). The computer receives modifications to the set of design element recommendations for the product from the product designer to form a final design of the product (step 616).

The computer generates the final design of the product based on the modifications to the set of design element recommendations for the product received from the product designer (step 618). The computer implements the final design of the product in a production system to produce the product using an appropriate application programming interface to communicate with the production system (step 620). Thereafter, the process terminates.

Thus, illustrative embodiments of the present invention provide a computer-implemented method, computer system, and computer program product for generating insights into the design of a product based on a plurality of product desirability models that were generated based on analysis of data corresponding to the product, which include product designer studio data, store data, and local business environment and weather data, and data describing interactions between potential consumers of the product and the product, itself, while in store prior to making a purchasing decision. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a product design, the computer-implemented method comprising:
   generating, by a product design manager of a computer, a plurality of product desirability models corresponding to a product based on analysis of data corresponding to the product and features of the product that affect physical interactions between potential consumers of the product and the product using a clustering algorithm or machine learning;
   generating, by the product design manager of the computer, a set of insights into design of the product based on the plurality of product desirability models corresponding to the product;
   generating, by the product design manager of the computer, a set of design element recommendations for the product based on the set of insights into the design of the product generated from the plurality of product desirability models;
   sending, by the computer, the set of design element recommendations for the product to a product designer during design development of the product;
   receiving, by the computer, modifications to the set of design element recommendations for the product from the product designer to form a final design of the product;
   generating, by the computer, the final design of the product based on the modifications to the set of design element recommendations for the product received from the product designer; and
   implementing, by the computer, the final design of the product in a production system producing the product using an application programming interface to communicate with the production system.

2. The computer-implemented method of claim 1 further comprising:
   collecting, by the computer, the data corresponding to the product and the features of the product that affect the physical interactions between the potential consumers of the product and the product from a studio of a product designer of the product, a set of stores that sells the product, a set of business data sources that provide local business environment information corresponding to the set of stores, and a set of weather data sources that provide local weather information corresponding to the set of stores.

3. The computer-implemented method of claim 1 further comprising:
   collecting, by the computer, the data describing the physical interactions between the potential consumers of the product and the product while the potential consumers try the product in the set of stores before making a purchasing decision.

4. The computer-implemented method of claim 1 further comprising:
   performing, by the computer, the analysis of the data corresponding to the product and the features of the product that affect the physical interactions and the data describing the physical interactions between the potential consumers of the product and the product using a clustering algorithm.

5. The computer-implemented method of claim 1, wherein the plurality of product desirability models corresponding to the product includes a product technical desirability model, a product design desirability model, a product functionality desirability model, a product seasonal desirability model, a product fashion desirability model, and a product commercial success model.

6. The computer-implemented method of claim 1, wherein the computer assigns a weight to each of the plurality of product desirability models based on input from a designer of the product.

7. The computer-implemented method of claim 1 further comprising:
   collecting, by the computer, the data corresponding to the product and the features of the product that affect the physical interactions between the potential consumers of the product and the product from a studio of a product designer of the product, a set of stores that sells the product, a set of business data sources that provide local business environment information corresponding to the set of stores, and a set of weather data sources that provide local weather information corresponding to the set of stores; and
   collecting, by the computer, the data describing the physical interactions between the potential consumers of the product and the product while the potential consumers try the product in the set of stores before making a purchasing decision.

8. A computer system for generating a product design, the computer system comprising:
   a bus system;
   a storage device connected to the bus system, wherein the storage device stores program instructions; and
   a processor connected to the bus system, wherein the processor executes the program instructions to:
      generate, using a product design manager, a plurality of product desirability models corresponding to a product based on analysis of data corresponding to the product and features of the product that affect physical interactions between potential consumers of the product and the product using a clustering algorithm or machine learning;
      generate, using the product design manager, a set of insights into design of the product based on the plurality of product desirability models corresponding to the product;
      generate, using the product design manager, a set of design element recommendations for the product based on the set of insights into the design of the product generated from the plurality of product desirability models;
      send the set of design element recommendations for the product to a product designer during design development of the product;
      receive modifications to the set of design element recommendations for the product from the product designer to form a final design of the product;
      generate the final design of the product based on the modifications to the set of design element recommendations for the product received from the product designer; and
      implement the final design of the product in a production system producing the product using an application programming interface to communicate with the production system.

9. The computer system of claim 8, wherein the processor further executes the program instructions to:
   collect the data corresponding to the product and the features of the product that affect the physical interactions between the potential consumers of the product and the product from a studio of a product designer of the product, a set of stores that sells the product, a set of business data sources that provide local business environment information corresponding to the set of stores, and a set of weather data sources that provide local weather information corresponding to the set of stores.

10. The computer system of claim 8, wherein the processor further executes the program instructions to:
    collect the data describing the physical interactions between the potential consumers of the product and the product while the potential consumers try the product in the set of stores before making a purchasing decision.

11. The computer system of claim 8, wherein the processor further executes the program instructions to:
    perform the analysis of the data corresponding to the product and the features of the product that affect the physical interactions and the data describing the physical interactions between the potential consumers of the product and the product using a clustering algorithm.

12. The computer system of claim 8, wherein the plurality of product desirability models corresponding to the product includes a product technical desirability model, a product design desirability model, a product functionality desirability model, a product seasonal desirability model, a product fashion desirability model, and a product commercial success model.

13. The computer system of claim 8, wherein the processor further executes the program instructions to:
    assign a weight to each of the plurality of product desirability models based on input from a designer of the product.

14. The computer system of claim 8, wherein the processor further executes the program instructions to:
    collect the data corresponding to the product and the features of the product that affect the physical interactions between the potential consumers of the product and the product from a studio of a product designer of the product, a set of stores that sells the product, a set of business data sources that provide local business environment information corresponding to the set of stores, and a set of weather data sources that provide local weather information corresponding to the set of stores; and
    collect the data describing the physical interactions between the potential consumers of the product and the product while the potential consumers try the product in the set of stores before making a purchasing decision.

15. A computer program product for generating a product design, the computer program product comprising a computer-readable storage medium having program instructions embodied therewith, the program instructions executable by a computer to cause the computer to perform a method of:
    generating, by a product design manager of the computer, a plurality of product desirability models corresponding to a product based on analysis of data corresponding to the product and features of the product that affect physical interactions between potential consumers of the product and the product using a clustering algorithm or machine learning;
    generating, by the product design manager of the computer, a set of insights into design of the product based on the plurality of product desirability models corresponding to the product;

generating, by the product design manager of the computer, a set of design element recommendations for the product based on the set of insights into the design of the product generated from the plurality of product desirability models;

sending, by the computer, the set of design element recommendations for the product to a product designer during design development of the product;

receiving, by the computer, modifications to the set of design element recommendations for the product from the product designer to form a final design of the product;

generating, by the computer, the final design of the product based on the modifications to the set of design element recommendations for the product received from the product designer; and implementing, by the computer, the final design of the product in a production system producing the product using an application programming interface to communicate with the production system.

16. The computer program product of claim 15 further comprising:

collecting, by the computer, the data corresponding to the product and the features of the product that affect the physical interactions between the potential consumers of the product and the product from a studio of a product designer of the product, a set of stores that sells the product, a set of business data sources that provide local business environment information corresponding to the set of stores, and a set of weather data sources that provide local weather information corresponding to the set of stores.

17. The computer program product of claim 15 further comprising:

collecting, by the computer, the data describing the physical interactions between the potential consumers of the product and the product while the potential consumers try the product in the set of stores before making a purchasing decision.

18. The computer program product of claim 15 further comprising:

performing, by the computer, the analysis of the data corresponding to the product and the features of the product that affect the physical interactions and the data describing the physical interactions between the potential consumers of the product and the product using a clustering algorithm.

19. The computer program product of claim 15, wherein the plurality of product desirability models corresponding to the product includes a product technical desirability model, a product design desirability model, a product functionality desirability model, a product seasonal desirability model, a product fashion desirability model, and a product commercial success model.

20. The computer program product of claim 15, wherein the computer assigns a weight to each of the plurality of product desirability models based on input from a designer of the product.

21. The computer program product of claim 15 further comprising:

collecting, by the computer, the data corresponding to the product and the features of the product that affect the physical interactions between the potential consumers of the product and the product from a studio of a product designer of the product, a set of stores that sells the product, a set of business data sources that provide local business environment information corresponding to the set of stores, and a set of weather data sources that provide local weather information corresponding to the set of stores; and collecting, by the computer, the data describing the physical interactions between the potential consumers of the product and the product while the potential consumers try the product in the set of stores before making a purchasing decision.

* * * * *